United States Patent
Goto et al.

(10) Patent No.: US 7,940,194 B2
(45) Date of Patent: May 10, 2011

(54) POSITION REGISTRATION DEVICE, ROUTE SEARCH DEVICE, POSITION REGISTRATION METHOD, POSITION REGISTRATION PROGRAM, AND RECORDING MEDIUM

(75) Inventors: Seiji Goto, Saitama (JP); Kenichiro Yano, Tokyo (JP)

(73) Assignee: Pioneer Corporation, Tokyo (JP)

( * ) Notice: Subject to any disclaimer, the term of this patent is extended or adjusted under 35 U.S.C. 154(b) by 388 days.

(21) Appl. No.: 12/282,135

(22) PCT Filed: Mar. 1, 2007

(86) PCT No.: PCT/JP2007/053964
§ 371 (c)(1),
(2), (4) Date: Oct. 14, 2008

(87) PCT Pub. No.: WO2007/105499
PCT Pub. Date: Sep. 20, 2007

(65) Prior Publication Data
US 2009/0153362 A1   Jun. 18, 2009

(30) Foreign Application Priority Data

Mar. 7, 2006 (JP) .................................. 2006-061033

(51) Int. Cl.
*B60Q 1/48* (2006.01)
(52) U.S. Cl. ..................... 340/932.2; 340/935; 701/200; 701/207; 701/208
(58) Field of Classification Search ................ 340/932.2
See application file for complete search history.

(56) References Cited

U.S. PATENT DOCUMENTS

2002/0193940 A1 * 12/2002 Hashida ................. 701/207
2003/0144792 A1 * 7/2003 Amano et al. .......... 701/207

FOREIGN PATENT DOCUMENTS

| JP | 10-176929 | 6/1998 |
|----|-----------|--------|
| JP | 10-197268 | 7/1998 |
| JP | 11-23302 | 1/1999 |
| JP | 2000-310542 | 11/2000 |
| JP | 2001-330455 | 11/2001 |
| JP | 2004-12425 | 1/2004 |
| JP | 2006-275837 | 10/2006 |
| JP | 2006-275838 | 10/2006 |

* cited by examiner

*Primary Examiner* — George A Bugg
*Assistant Examiner* — Kerri McNally
(74) *Attorney, Agent, or Firm* — Young & Thompson

(57) ABSTRACT

A position registering apparatus includes an acquiring unit that acquires traveling state information concerning a mobile object; a position identifying unit that identifies a current position of the mobile object based on the traveling state information and map information; a parking determining unit that determines whether the mobile object is parked when the current position is identified not be on a road; and a registering unit that registers a point of deviation from the road by the mobile object as an entrance point to a parking lot when the current position that has been identified to be on the road is identified to be not on the road and the mobile object is determined to be parked. The registering unit further registers the current position identified upon the parking determining unit determining that the mobile object is parked, as a parking lot position correlated with the entrance point.

8 Claims, 10 Drawing Sheets

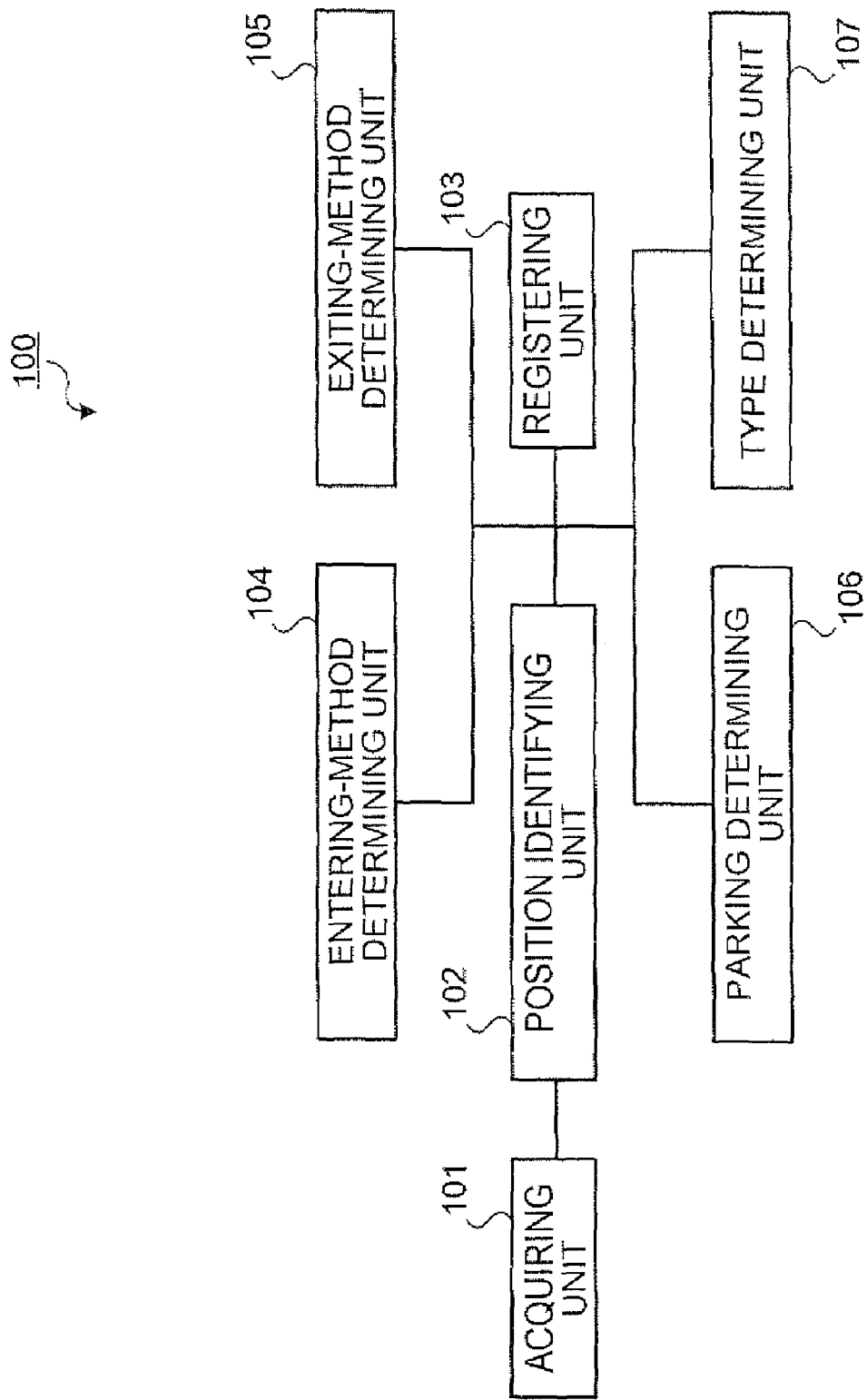

US 7,940,194 B2

POSITION REGISTRATION DEVICE, ROUTE SEARCH DEVICE, POSITION REGISTRATION METHOD, POSITION REGISTRATION PROGRAM, AND RECORDING MEDIUM

TECHNICAL FIELD

The present invention relates to a position registering apparatus, a route retrieval apparatus, a position registering method, a position registering program, and a recording medium capable of automatically registering an entrance point to and an exit point from a parking lot based on an identified current position of mobile object.

BACKGROUND ART

Conventionally, an information providing apparatus has been provided that includes a current position calculating unit calculating a current position of a vehicle; a parking lot information acquiring unit acquiring parking lot information from the current position calculated by the current position calculating unit and parking lot locating data read from a map data storage unit; a route retrieving unit conducting route retrieval taking into account entrances and exits based on the information from the parking lot information acquiring unit and the map data storage unit; the map data storage unit storing map data and parking lot data; a display controlling unit conducting control for displaying a result of route retrieval taking into account entrances and exits retrieved by the route searching unit; and a displaying unit controlled by the display controlling unit and displaying the result of route retrieval taking into account entrances and exits, where the information providing apparatus can provide effective information taking into account entrances and exits of facilities such as parking lots (see, e.g., Patent Document 1).

Patent Document 1: Japanese Patent Application Laid-Open Publication No. 2004-12425

DISCLOSURE OF INVENTION

Problem to be Solved by the Invention

However, in the case of the information providing apparatus of the conventional art described in Patent Document 1, if the route retrieving unit retrieves a route to a parking lot when an entrance point to the parking lot is not recorded in the map information, the parking lot information. etc., only a route to the vicinity of the parking lot can be retrieved. Therefore, even if one can somehow arrive at the vicinity of the parking lot, it is problematic in that an entrance of the parking lot can not immediately be identified and that the entrance of the parking lot must be searched for after arrival, posing a significant inconvenience, for example.

Although it is conceivable to preliminarily record entrance points of parking lots for all the parking lots included in map information, parking lot information, etch, it is problematic in that data edit operations, etc., become very difficult due to an increase in the amount of recorded data, resulting in increased product cost, for example.

Although it is conceivable that entrance points and exit positions are embedded in map information, parking lot information, etc., through operation and input by a user for parking lots utilized by the user, it is problematic in that associated input operations are troublesome for the user and improved convenience cannot be expected, for example.

Means for Solving Problem

To solve the problems above and achieve an object, a position registering apparatus according to the invention of claim 1 includes an acquiring unit that acquires traveling state information indicating a traveling state of a mobile object; a position identifying unit that identifies a current position of the mobile object based on the traveling state information and map information; and a registering unit that registers, into a storage unit, a deviation point on a road as an entrance point to a parking lot if the current position of the mobile object identified to be on a road is identified to be at a place other than the road by the position identifying unit.

A route retrieval apparatus according to the invention of claim 8 includes the position registering apparatus according to claim 6 or 7; a destination setting unit that sets the parking lot position registered in the storage unit as a destination; and a route retrieving unit that searches a route to the entrance point registered and correlated with the parking lot position if the parking lot position is set as a destination.

A route retrieval apparatus according to the invention of claim 9 includes the position registering apparatus according to claim 6 or 7; a destination setting unit that sets a destination; a route retrieving unit that retrieves a route to a destination from the exit position registered and correlated with the parking lot position if the destination is set when the current position of the mobile object is within a predetermined range from the parking lot position registered in the storage unit and identified at a place other than a road.

A position registering method according to the invention of claim 10 includes an acquiring step of acquiring traveling state information indicating a traveling state of a mobile object; a position identifying step of identifying a current position of the mobile object based on the traveling state information and map information; and a registering step of registering, into a storage unit, a deviation point on a road as an entrance point to a parking lot if the current position of the mobile object identified to be on a road is identified to be at a place other than the road at the position identifying step.

A position registering computer-program according to the invention of claim 11 causes a computer to execute the position registering method according to claim 10.

A computer-readable recording medium according to the invention of claim 12 stores therein the position registering computer-program according to claim 11.

BRIEF DESCRIPTION OF DRAWINGS

FIG. 1 is a block diagram of a functional configuration of a position registering apparatus according to an embodiment;

FIG. 6-1 is a view of an example of a case when a vehicle deviates from a road to enter a parking lot;

FIG. 6-2 is an explanatory view of a process when a deviation point is identified;

FIG. 9-1 is a view of an example of a case when a vehicle exits from a parking lot onto a road; and FIG. 9-2 is an explanatory view for explaining a process when a returning point is identified.

Figure 2:
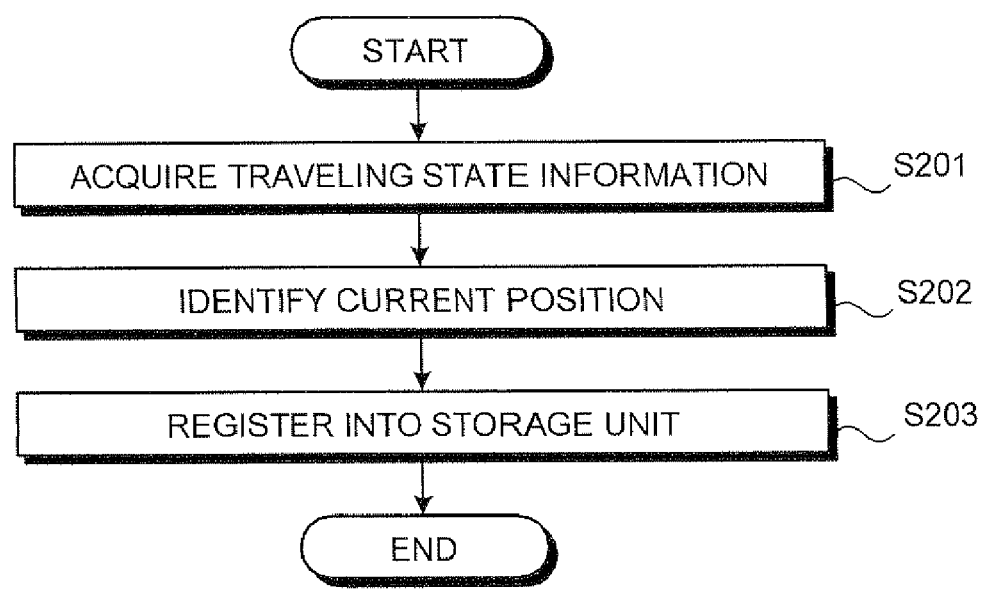
FIG. 2 is a flowchart of an example of a process of the position registering apparatus according to the embodiment.

EXPLANATIONS OF LETTERS OR NUMERALS 100 position registering apparatus
101 acquiring unit
102 position identifying unit
103 registering unit
104 entering-method determining unit
105 exiting-method determining unit
106 parking determining unit
107 type determining unit

BEST MODE(S) FOR CARRYING OUT THE INVENTION

A preferred embodiment will be described hereinafter for a position registering apparatus, a route retrieval apparatus, a position registering method, a position registering program, and a recording medium according to the present invention with reference to the accompanying drawings.

Embodiment (Functional Configuration of Position Registering Apparatus)

Figures 1, 6:
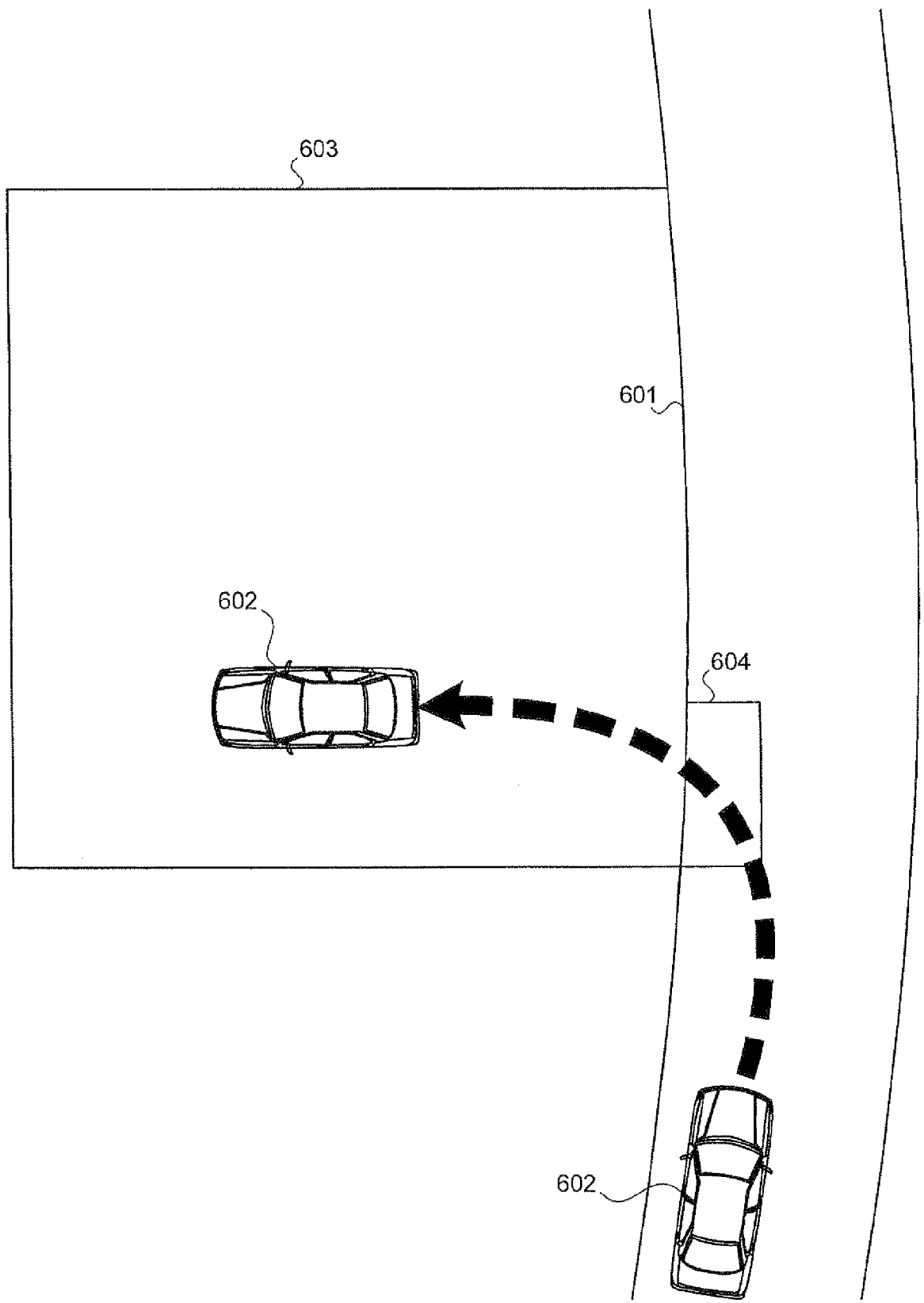
Figures 2, 6:
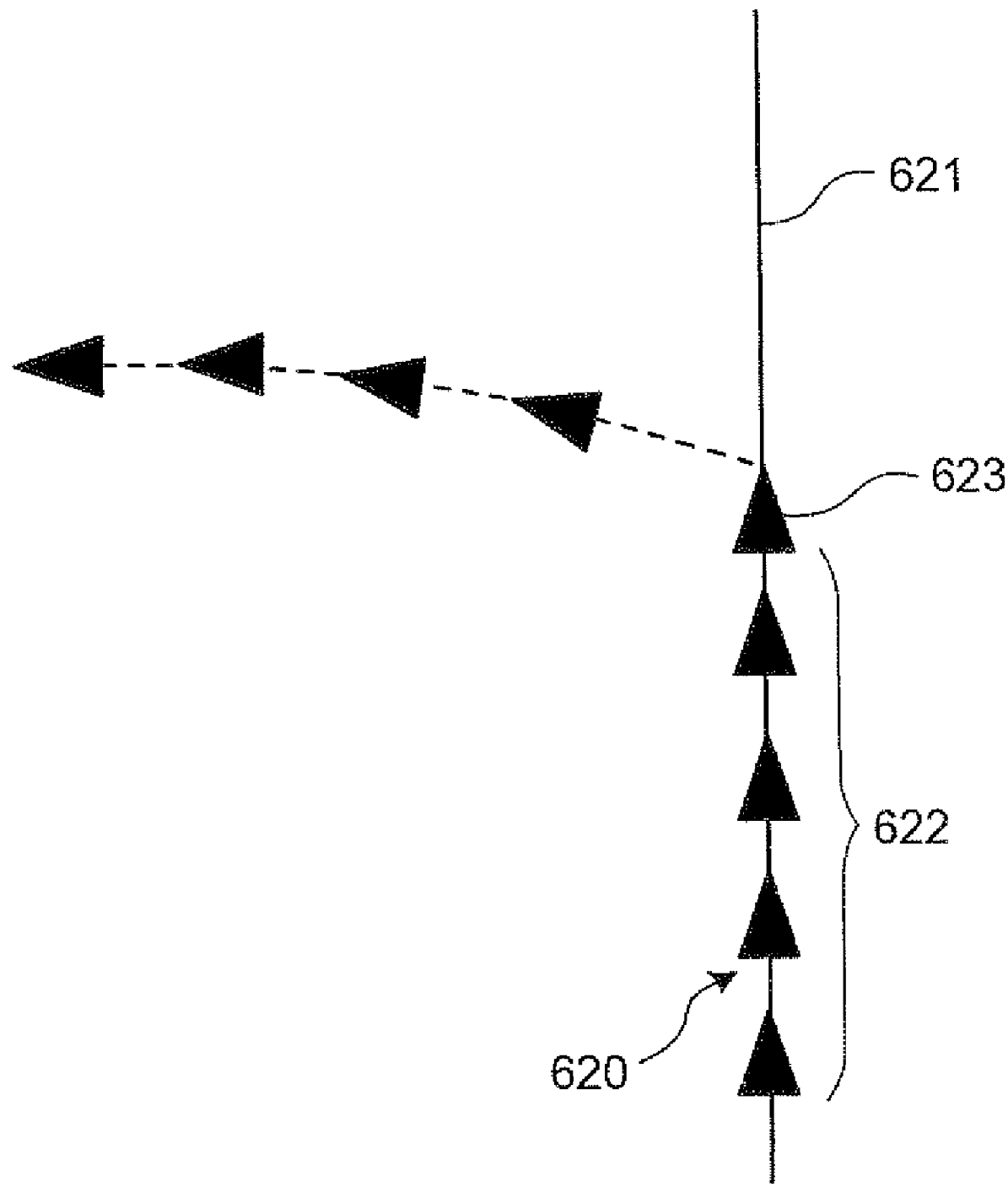

A functional configuration of a position registering apparatus according to the embodiment is described with reference to FIG. 1. FIG. 1 is a block diagram of a functional configuration of a position registering apparatus according to the embodiment. As shown in FIG. 1, a position registering apparatus 100 includes an acquiring unit 101, a position identifying unit 102, a registering unit 103, an entering-method determining unit 104, an exiting-method determining unit 105, a parking determining unit 106, and a type determining unit 107.

The acquiring unit 101 acquires traveling state information indicating the traveling state of a mobile object. The traveling state information is information including position information, velocity information, and traveling direction information concerning the mobile object, for example. The traveling state information is calculated with the use of signals received from GPS satellites by a GPS receiver mounted on the mobile object or values output from various sensors disposed on the mobile object.

The position identifying unit 102 identifies the current position of the mobile object based on the traveling state information acquired by the acquiring unit 101 and map information. The map information is information such as road shape information consisting of nodes and links, and image data drawn with the use of features related to facilities, roads, and other geographic features (mountains, rivers, land).

For example, the position identifying unit 102 identifies the current position of the mobile object on a road by executing a map matching process to correct an estimated current position, which is the current position of the mobile object calculated from signals received from GPS satellites and output values of various sensors, or identifies the estimated current position directly as the current position of the mobile object at a place other than on a road.

The map matching process is a process of comparing the road shape data with position information, a traveling direction, a traveling distance, etc., of the mobile object to correct the position of the mobile object on a road if it is determined the mobile object is moving on the road.

The registering unit 103 registers, into a storage unit not shown, a deviation point on a road as an entrance point to a parking lot, if the current position of the mobile object identified to be on a road is identified to be at a place other than a road by the position identifying unit 102. The deviation point is the last current position of the mobile object identified on the road by the position identifying unit 102 when the mobile object deviates from the road to a place other than the road.

After registration of an entrance point to a parking lot, if the current position of the mobile object identified at a place other than a road is identified to be on a road by the position identifying unit 102, the registering unit 103 registers, into the storage unit not shown, a returning point on the road as an exit point from the parking lot. The returning point is the first current position of the mobile object identified on a road by the position identifying unit 102 when the mobile object returns onto a road from a place other than a road. The entrance point to and the exit point from the parking lot may be registered in correlated manner.

The entering-method determining unit 104 determines an entering method based on a traveling state of the mobile object when the current position of the mobile object identified on a road is identified to be at a place other than a road by the position identifying unit 102. The registering unit 103 registers, into the storage unit and in correlation with the entrance point to the parking lot, the entering method determined by the entering-method determining unit 104.

The entering method indicates how the mobile object entered the parking lot through the entrance point from a road and, for example, the entering method may indicate that the mobile object turns right, turns left, or goes straight to enter the entrance point to the parking lot from a road. If the entering-method determining unit 104 determines the entering method, the entering method indicating how the entrance point to the parking lot can be entered from the road is registered into the storage unit, not shown, in correlation with the entrance point to the parking lot.

The exiting-method determining unit 105 determines an exiting method based on a traveling state of the mobile object when the current position of the mobile object identified at a place other than a road is identified to be on a road by the position identifying unit 102. The registering unit 103 registers, into the storage unit and in correlation with the exit point from the parking lot, the exiting method determined by the exiting-method determining unit 105.

The exiting method indicates how the mobile object exited the parking lot through the exit point onto a road and, for example, the exiting method may indicate that the mobile object turns right, turns left, or goes straight to exit from the exit point from the parking lot onto a road. If the exiting-method determining unit 105 determines the exiting method, the exiting method indicating how the parking lot can be exited from the exit point onto the road is registered into the storage unit, not shown, in correlation with the exit point from the parking lot.

The parking determining unit 106 determines whether the mobile object is parked when the position identifying unit 102 identifies the current position of the mobile object at a place other than a road. Parking as used herein means a state in which the current position of the mobile object does not change (e.g., for five minutes). With regard to the determination of whether the mobile object is parked, the parking determining unit 106 determines that the mobile object is parked if, from the traveling state information, it is detected that the current position of the mobile object does not change from a place other than a road for a predetermined time.

The parking determining unit 106 may determine that the mobile object is parked if, from the traveling state information and the map information, it is detected that the current position of the mobile object identified at a place other than a road is present within a range of a parking lot recorded in the map information. The parking determining unit 106 may also determine that the mobile object is parked if it is detected that a drive source of the mobile object is stopped.

If the current position of the mobile object identified on a road is identified to be at a place other than a road, the registering unit 103 may temporarily save a deviation point in a memory, etc. not shown, without registration, and when the parking determining unit 106 determines that the mobile object is parked, the registering unit 103 may register, into the storage unit not shown, the temporarily saved deviation point as an entrance point to the parking lot.

If the parking determining unit 106 determines that the mobile object is not parked, the registering unit 103 does not register into the storage unit, the temporarily saved deviation point as an entrance point to the parking lot. As described above, even if the current position of the mobile object is identified at a place other than a road, if it is not determined that the mobile object is parked, an entrance point to the parking lot is not registered.

Therefore, when it is determined that a deviation point is not an entrance point to a parking lot, in such a case where the current position of the mobile object returns onto a road immediately after the current position of the mobile object is identified at a place other than a road, incorrect registration of an entrance point to the parking lot can be prevented.

The registering unit 103 may register, into the storage unit as a parking lot position and in correlation with the entrance point to the parking lot, the current position identified when it is determined that the mobile object is parked.

If the parking determining unit 106 determines that the mobile object is parked, the type determining unit 107 determines the type of the parking lot based on the traveling state of the mobile object after the current position of the mobile object identified on a road is identified to be at a place other than the road. Types of parking lots are roughly classified into open-space type parking lots and building type parking lots. The open-space type parking lots include, for example, an outdoor flat parking lot and the building type parking lots include, for example, a multilevel parking lot and an underground parking lot.

The type of parking lot is determined with the use of the traveling state information acquired by the acquiring unit 101. For example, if the reception sensitivity for signals received from the GPS satellites by the GPS receiver does not change, the type determining unit 107 determines that the parking lot is an outdoor parking lot. For example, if the signals cannot be received from the GPS satellites located in a vertical direction or if it is detected that the mobile object ascends up a slope, it is determined that the parking lot is a multilevel parking lot. For example, if the reception sensitivity of the signals is less than or equal to a threshold value or if it is detected that the mobile object descends down a slope, it is determined that the parking lot is an underground parking lot.

If the type determining unit 107 determines the type of the parking lot, the registering unit 103 registers and correlates the parking lot type determined by the type determining unit 107 with the parking lot position.

(Details of Process of Position Registering Apparatus)

Details of the process of the position registering apparatus according to the present invention are described. FIG. 2 is a flowchart of an example of the process of the position registering apparatus according to the embodiment. As shown in the flowchart of FIG. 2, in the position registering apparatus 100, the acquiring unit 101 acquires traveling state information indicating a traveling state of the mobile object (step S201). The traveling state information acquired by the acquiring unit 101 is information including position information, velocity information, traveling direction information, etc., of the mobile object.

The position identifying unit 102 identifies the current position of the mobile object, based on the traveling state information acquired by the acquiring unit 101 and map information (step S202). The current position of the mobile object identified by the position identifying unit 102 may be, for example, the estimated current position calculated from signals received from GPS satellites and values output from various sensors or the current position obtained by correcting the estimated current position with the map matching process.

If the current position of the mobile object identified on a road is identified to be at a place other than a road by the position identifying unit 102, the registering unit 103 registers, into a storage unit not shown, a deviation point on the road as an entrance point to a parking lot (step S203), and a sequence of the process is ended. The entrance point to the parking lot registered by the registering unit 103 is the last current position of the mobile object identified on the road by the position identifying unit 102 when the mobile object deviates from the road to a place other than the road.

When the current position of the mobile object identified on a road is identified to be at a place other than a road, the registering unit 103 may temporarily save the deviation point in a memory, etc. not shown, without registration, and if the parking determining unit 106 determines that the mobile object is parked, the registering unit 103 may register, in the storage unit not shown, the temporarily saved deviation point as an entrance point to the parking lot.

After the registration of the entrance point to the parking lot by the registering unit 103 at step S203, if the current position of the mobile object identified at a place other than a road is identified to be on a road by the position identifying unit 102, a returning point on the road may be registered into the storage unit as an exit point from the parking lot. The exit point from the parking lot registered by the registering unit 103 is the first current position of the mobile object identified on a road by the position identifying unit 102 when the mobile object returns to a road from a place other than a road.

If the entering-method determining unit 104 determines an entering method at step S202, the registering unit 103 may register the entering method into the storage unit, not shown, in correlation with the entrance point to the parking lot. If the exiting-method determining unit 105 determines an exiting method, the exiting method may be registered into the storage unit, not shown, in correlation with the exit point from the parking lot.

When the current position of the mobile object is identified at a place other than a road, if the parking determining unit 106 determines that the mobile object is parked, the registering unit 103 may register, into the storage unit and in correlation with the entrance point to the parking lot, the current position of the mobile object as a parking lot position. If the type determining unit 107 determines the type of the parking lot, the type of the parking lot may be registered into the storage unit, not shown, in correlation with the parking lot position.

(Functional Configuration of Route Retrieval Apparatus)

Figure 3:
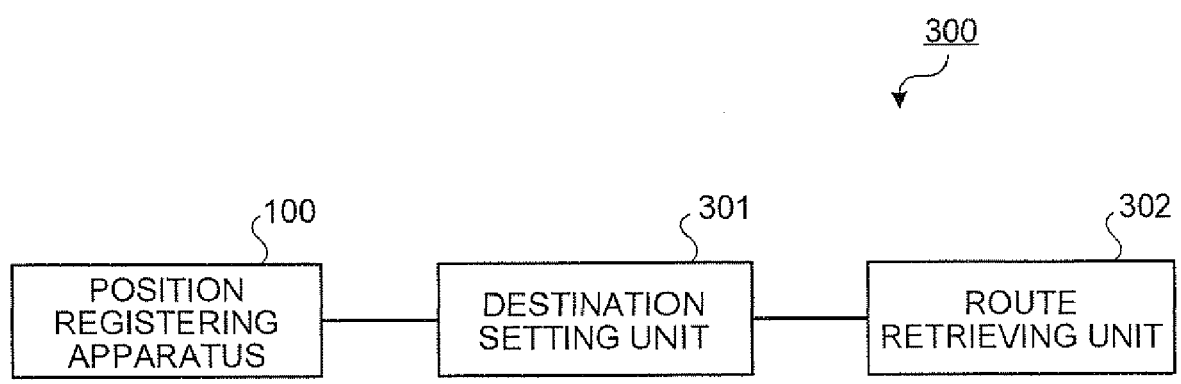
FIG. 3 is a block diagram of a functional configuration of a route retrieval apparatus according to the embodiment.

A functional configuration of a route retrieval apparatus according to the embodiment is described with reference to FIG. 3. FIG. 3 is a block diagram of a functional configuration of a route retrieval apparatus according to the embodiment. In FIG. 3, a route retrieval apparatus 300 includes the position registering apparatus 100, a destination setting unit 301, and a route retrieving unit 302.

The position registering apparatus 100 identifies the current position of the mobile object to register an entrance point to and an exit point from a parking lot as described above. The position registering apparatus 100 also registers an entering method to the entrance point to the parking lot in correlation with the entrance point to the parking lot and registers an exiting method from the exit point from the parking lot in correlation with the exit point from the parking lot.

When the current position of the mobile object is identified at a place other than a road, if it is determined that the mobile object is parked, the position registering apparatus 100 registers the current position as a parking lot position. If the type of the parking lot is determined, the position registering apparatus 100 also registers the type of the parking lot in correlation with the parking lot position.

The destination setting unit 301 accepts input from a user to set a destination. The destination setting unit 301 can set the parking lot position registered in the storage unit, not shown, as the destination. The parking lot position is the current position of the mobile object identified by the position identifying unit 102 (see FIG. 1) when the parking determining unit 106 (see FIG. 1) of the position registering apparatus 100 determines that the mobile object is parked.

When the destination setting unit 301 sets the parking lot position as the destination, the route retrieving unit 302 retrieves a route to the entrance point to the parking lot registered and correlated with the parking lot position. If the entering method determined by the entering-method determining unit 104 (see FIG. 1) is registered and correlated with the entrance of the parking lot, the route retrieving unit 302 may retrieve a route to the entrance point to the parking lot with the use of this entering method. For example, if turning left is registered as the entering method, the route retrieving unit 302 retrieves a route for turning left to enter into the entrance point to the parking lot.

When the current position of the mobile object is identified within a parking lot (at a place other than a road and within a predetermined range from a parking position), if the destination setting unit 301 sets a destination, the route retrieving unit 302 retrieves a route from the exit point from the parking lot to the destination. If the exiting method determined by the exiting-method determining unit 105 (see FIG. 1) is registered and correlated with the exit of the parking lot, the route retrieving unit 302 may retrieve a route from the exit point from the parking lot to the destination with the use of this exiting method. For example, if turning left is registered as the exiting method, the route retrieving unit 302 retrieves a route for turning left at the exit point from the parking lot to exit onto the road.

As described above, according to the embodiment, if the current position of the mobile object identified on a road is identified to be at a place other than a road, the position registering apparatus 100 can register a deviation point on the road as an entrance point to a parking lot. After the registration of the entrance point to the parking lot, if the current position of the mobile object identified at a place other than a road is identified to be on a road, the position registering apparatus 100 can register a returning point on the road as an exit point from the parking lot.

Therefore, the position registering apparatus 100 can automatically register the deviation point from a road and the returning point to a road as the entrance point to the parking lot and the exit point from the parking lot, respectively, by identifying the current position of the mobile object on a road and outside of a road.

The position registering apparatus 100 can determine whether the mobile object is parked when the current position of the mobile object is identified at a place other than a road. The position registering apparatus 100 can be configured to register the entrance point to the parking lot if it is determined that the mobile object is parked at a place other than a road, thereby preventing incorrect registration such as registering an entrance point to a parking lot at a place that is not a parking lot and enabling more accurate registration of an entrance is point to a parking lot.

When the current position of the mobile object is identified at a place other than a road, if it is determined that the mobile object is parked, the identified current position can be registered as a parking lot position. Therefore, the registered parking lot position can be utilized as the map information. Since a type of a parking lot can be registered and correlated with the parking lot position, a type of a parking lot can be utilized as the map information in conjunction with the parking lot position.

When retrieving a route to the parking lot position registered by the position registering apparatus 100, the route retrieval apparatus 300 can retrieve a more suitable route by retrieving a route to the entrance point of the parking lot registered and correlated with the parking lot position.

If the entering method to the entrance point of the parking lot is registered and correlated with the entrance point to the parking lot, a route can be retrieved with the use of the entering method to retrieve a more suitable route taking into account the entering method to the entrance point of the parking lot.

If a route is retrieved when the current position of the mobile object is identified at a place other than a road and within a predetermined range from the parking position registered by the position registering apparatus 100, the route retrieval apparatus 300 can retrieve a more suitable route by retrieving a route to the destination from the exit point from the parking lot registered and correlated with the parking lot position.

If the exiting method from the exit point of the parking lot is registered and correlated with the exit point from the parking lot, a route can be retrieved with the use of this exiting method to retrieve a more suitable route taking into account the exiting method from the exit point of the parking lot.

An example according to the embodiment of the present invention is described in detail. The description is made by exemplarily illustrating a case where the position registering apparatus according to the embodiment is applied to a navigation apparatus mounted on a vehicle (including four-wheel vehicles and two-wheel vehicles) to recognize an entrance/exit of a parking lot.

EXAMPLE

Hardware Configuration of Navigation Apparatus

Figure 4:
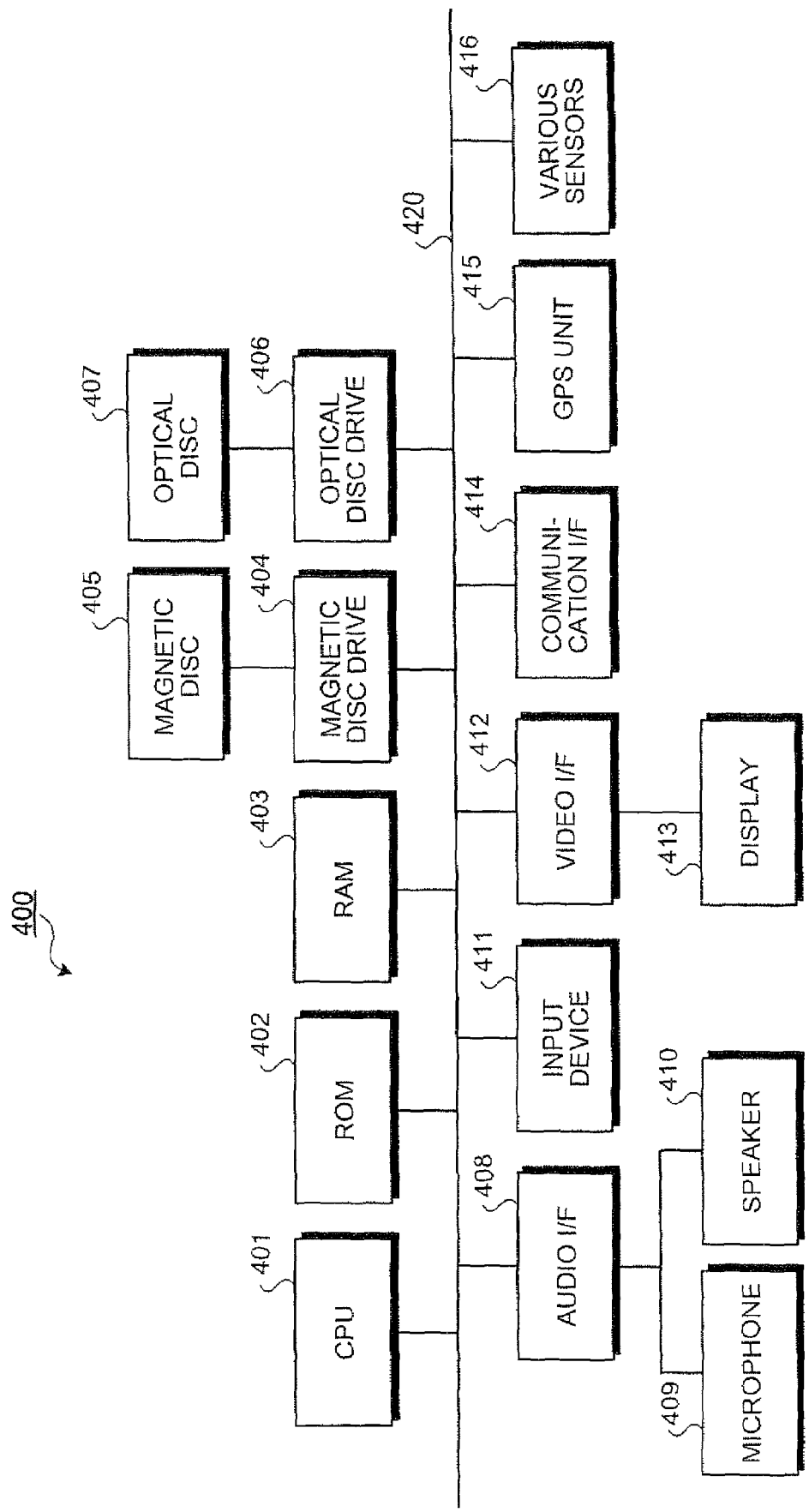
FIG. 4 is a block diagram of a hardware configuration of a navigation apparatus according to an example of the present invention.

A hardware configuration is described for a navigation apparatus 400 according to an example of the present invention. FIG. 4 is a block diagram of a hardware configuration of a navigation apparatus according to the example of the present invention. As shown FIG. 4, the navigation apparatus 400 includes a CPU 401, a ROM 402, a RAM 403, a magnetic disc drive 404, a magnetic disc 405, an optical disc drive 406, an optical disc 407, an audio I/F (interface) 408, a microphone 409, a speaker 41D, an input device 411, a video I/F (interface) 412, a display 413, a communication I/F (interface) 414, a GPS unit 415, and various sensors 416, respectively connected through a bus 420.

The CPU 401 governs overall control of the navigation apparatus 400. The ROM 402 stores therein various programs such as a boot program, a current-position calculating program, a current-position identifying program, a route retrieval program, a route guidance program, a sound generating program, a map-information display program, a communication program, a database generating program, a data analysis program, and a position recording program.

The current-position calculating program causes the current position of the vehicle (the current position of the navigation system 400) to be calculated based on output information concerning the GPS unit and the various sensors 416 described later.

The current-position identifying program causes the current position of the vehicle to be identified on a road or at a place other than a road based on the current position (estimated current position) calculated by executing the current-position calculating program and the road shape data of the map information recorded on the magnetic disc 405 described later.

The route retrieval program causes the optimum route from a start point to a destination to be retrieved with the use of the map information, etc., recorded on the magnetic disc 405 described later. The optimum route is the shortest (or fastest) route to the destination or a route most satisfying a condition specified by a user. A guide route retrieved by executing the route retrieval program is output to the audio I/F 408 or the video I/F 412 though the CPU 401, for example.

The route guidance program causes route guidance information to be generated in real time based on guide route information retrieved by executing the route retrieval program, position information indicating the current position of the vehicle identified by executing the current-position identifying program, and the map information recorded on the magnetic disc 405 described later. The route guidance information generated by executing the route guidance program is output to the audio I/F 408 or the video I/F 412 though the CPU 401, for example.

The sound generating program causes information to be generated for tones and sounds corresponding to sound patterns. That is, audio guidance information corresponding to guidance points is caused to be generated based on the route guidance information generated by executing the route guidance program. The generated audio guidance information is output to the audio I/F 408 though the CPU 401, for example.

The map-information display program causes a display format of the map information that is displayed on the display 413 by the video I/F 412 to be determined and causes the map information to be displayed on the display 413 in the determined format.

The position recording program causes the entrance point or the exit point from the parking lot to be recognized with the use of the current position identified by the current-position identifying program and the map information recorded on the magnetic disc 405 described later. The recognized entrance point or exit point from the parking lot is caused to be recorded in a recording medium such as the magnetic disc 405 and the optical disc 407 described later or a memory not shown.

The ROM 403 is used as a work area of the CPU 401, for example.

The magnetic disc drive 404 controls the reading/writing of data from/to the magnetic disc 405 under the control of the CPU 401. The magnetic disc 405 stores thereon the data written under the control of the magnetic disc drive 404. The magnetic disc 405 may be an HD (hard disc) or an FD (flexible disc), for example.

An example of information recorded on the magnetic disc 405 includes map information used for route retrieval/route guidance. The map information includes background data representing features such as buildings, rivers, and ground surfaces, and road shape data representing shapes of roads. The map information is depicted two-dimensionally or three-dimensionally on the display 413. During the route guidance by the navigation apparatus 400, the map information and a vehicle mark are superimposed and displayed to indicate the current position of the vehicle acquired by the GPS unit described later.

The road shape data also includes traffic condition data. The traffic condition data includes, for example, information concerning the presence of a traffic light, a crosswalk, entrances/exits and junctions of expressways for nodes, and lengths (distances) of links, road widths, direction of travel, road types (such as expressway, toll road, general road), etc., for links.

Among the traffic condition data, information concerning past traffic congestion is stored as past traffic congestion information after statistical processing based on season, day of the week, long holiday seasons, the time of day, etc. Although the navigation apparatus 400 acquires, for example, information concerning current traffic congestion from road traffic information received by the communication I/F 414 described later, the past traffic congestion information can be used to forecast congestion at a specified time of day, for example.

Although the map information is recorded on the magnetic disc 405 in this example, the map information may be recorded on the optical disc 407 described later. The map information is recorded not only in the constituent units integrally provided among the hardware of the navigation apparatus 400 and may be provided externally from the navigation apparatus 400. In this case, the navigation apparatus 400 may acquire the map information through the communication I/F 414 via a network. The map information acquired in this way is stored in the RAM 403, for example.

The optical disc drive 406 controls the reading/writing of data from/to the optical disc 407 under the control of the CPU 401. The optical disc 407 is a removable recording medium and data is read from the optical disc 407 under the control of the optical disc drive 406. A writable recording medium can be utilized for the optical disc 407. The removable recording medium can be a medium other than the optical disc 407, such as an MO and a memory card.

The audio I/F 408 is connected to the microphone 409 for audio input and the speaker 410 for audio output. Sounds received by the microphone 409 are A/D-converted within the audio I/F 408. The speaker 410 may be disposed not only on the inside of the vehicle but also on the outside of the vehicle. The speaker 410 outputs sounds based on audio signals from the audio I/F 408. The sounds input from the microphone 409 can be recorded as audio data on a recording medium such as the magnetic disc 405, the optical disc 407, or on a memory not shown.

The input device 411 includes a remote controller including keys for entering characters, numeric values, and various instructions, a keyboard, a mouse, a touch panel, etc.

The video I/F 412 is connected to the display 413. Specifically, the video I/F 412 includes, for example, a graphic controller that generally controls the display 413, a buffer memory such as VRAM (Video RAM) that temporarily stores immediately displayable image information, and a control IC that controls the display 413 based on image data output from the graphic controller.

The display 413 displays icons, cursors, menus, windows, or various data such as text and images. For example, a CRT, a TFT liquid crystal display, a plasma display, etc., can be employed as the display 413.

The communication I/F 414 is wirelessly connected to a network and functions as an interface between the navigation apparatus 400 and the CPU 401. Further, the communication I/F 414 is wirelessly connected to a communication network such as the Internet and functions as an interface between the CPU 401 and the communication network.

The network includes a LAN, a WAN, a public line network, a portable telephone network, etc. Specifically, the communication I/F 414 includes, for example, an FM tuner, a VICS (Vehicle Information and Communication System: registered trademark)/beacon receiver, a radio navigation apparatus, and other navigation devices, and acquires the road traffic information, concerning for example congestion and traffic regulations, distributed from VICS centers.

The GPS unit 415 receives signals from GPS satellites and outputs information indicating the current position of the vehicle. The information output by the GPS unit 415 is used along with output values of the various sensors 416 described later when the CPU 401 calculates the current position (estimated current position) of the vehicle. The information indicating the current position is information identifying one point on the map information, for example, latitude/longitude and altitude.

The various sensors 416 output information that can be used to determine the position and behavior of the vehicle, such as a vehicle speed sensor, an acceleration sensor, and an angular speed sensor. The values output by the various sensors 416 are used by the CPU 401 for calculating the current position (estimated current position) of the vehicle and measuring variations in velocity and direction.

The various sensors 416 include a sensor that detects vehicle operations by a driver. The vehicle operations detected may include steering operations, input for turn signals, the opening/closing of vehicle doors, the turning on/off of the engine (or the on/off of ACC power source), etc.

Specifically, with regard to the functional constituent units of the position registering apparatus 100 according to the embodiment shown in FIG. 1, i.e., the acquiring unit 101, the position identifying unit 102, the registering unit 103, the entering-method determining unit 104, the exiting-method determining unit 105, the parking determining unit 106, and the type determining unit 107, the functions thereof are implemented by the CPU 401, the magnetic disc 405, the GPS unit 415, and the various sensors 416, for example. With regard to the functional constituent units of the route retrieval apparatus 300 according to the embodiment shown in FIG. 3, the function of the destination setting unit 301 is implemented by the input device 411, and the function of the route retrieving unit 302 is implemented by the CPU 401 executing the route retrieval program recorded on the ROM 402, etc.

(Position Recording Process Procedure of Navigation Apparatus)

Figure 5:
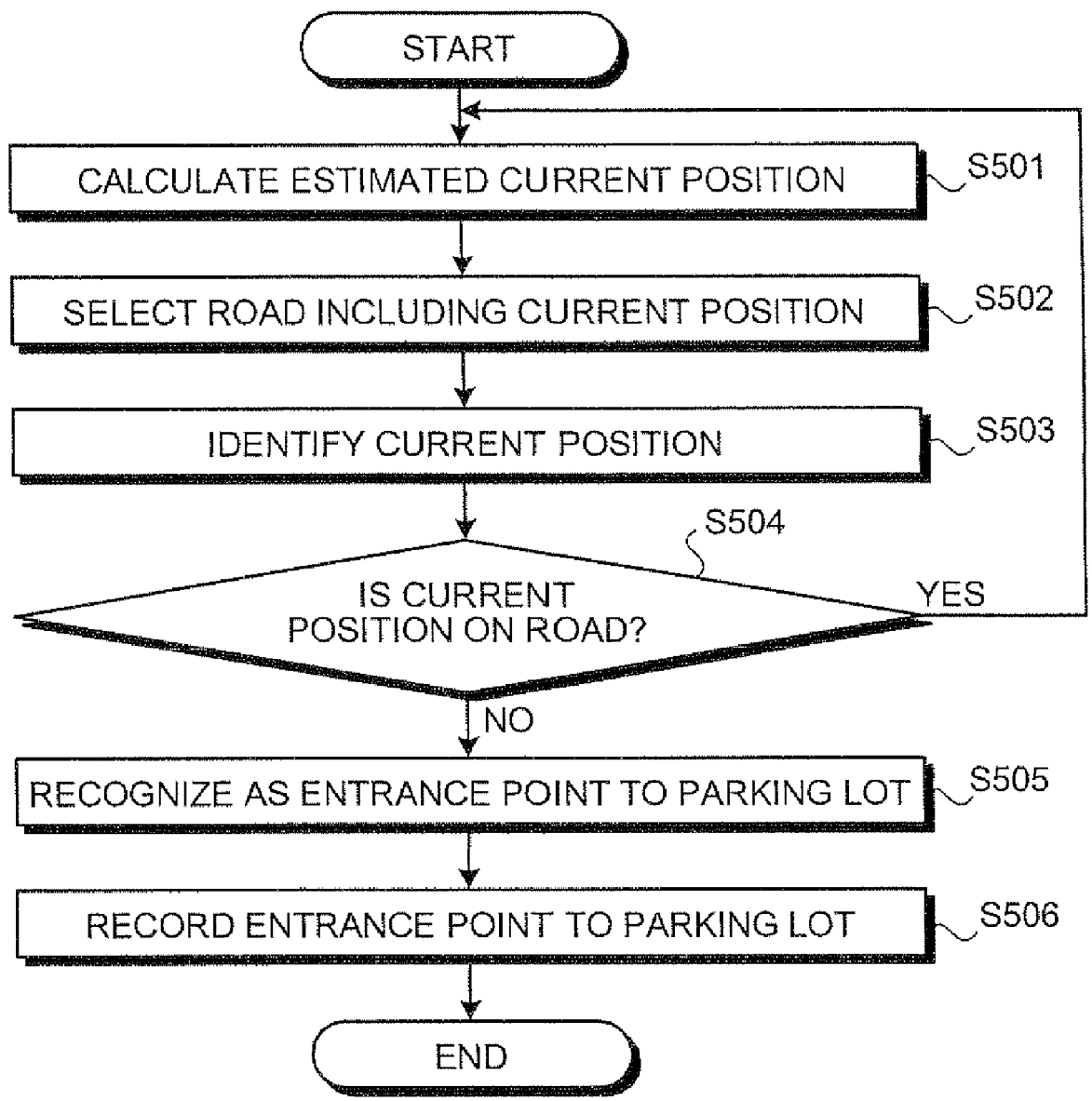
FIG. 5 is a flowchart of an example of the position recording process procedure of the navigation apparatus according to the example of the present invention.

An example of a position recording process procedure of the navigation apparatus 400 according to the example of the present invention is described. FIG. 5 is a flowchart of an example of the position recording process procedure of the navigation apparatus according to the example of the present invention.

As shown in the flowchart of FIG. 5, the navigation apparatus 400 calculates the current position (estimated current position) of the vehicle based on information output from the GPS unit 415 and the various sensors 416 (step S501). The estimated current position is calculated based on, for example, the signals received from the GPS satellites providing position information indicative of the current position of the vehicle, vehicle speed information output from the car speed sensor, and information concerning the amount of change in the direction of the vehicle output from the direction sensor.

Based on the estimated current position of the vehicle calculated at step S501, a road including the current position of the vehicle is selected (step S502). For example, a road closest to the estimated current position selected as a road including the current position of the vehicle. Alternatively, a direction of a road present within a predetermined range from the estimated current position (road direction) may be compared with the traveling direction of the vehicle to select a road including the current position of the vehicle. If it is determined that the vehicle is not traveling on a road, a selection is not made of a road including the current position of the vehicle.

The current position of the vehicle is identified based on the information concerning the estimated current position calculated at step S501 and the road shape data of the road selected at step S502. Specifically, for example, if a road including the current position of the vehicle is selected at step S502, the map matching process is executed to identify a position on a road corrected by the map matching process as the current position of the vehicle. If a road including the current position of the vehicle is not selected at step S502, the estimated current position calculated at step S501 is identified as the current position of the vehicle.

It is determined whether the current position of the vehicle identified at step S503 is on a road (step S504). Specifically, if the current position of the vehicle identified at step S503 is a position corrected onto a road by the map matching process, it is determined that the current position of the vehicle is on a road. If the current position of the vehicle identified at step S503 is the estimated current position calculated at step S501, it is determined that the current position of the vehicle is not on a road.

If it is determined at step S504 that the current position of the vehicle is not on a road (step S504: NO), a deviation point where the vehicle deviated from the road is recognized as an entrance point to a parking lot (step S505). The deviation point is the last current position of the vehicle identified on the road.

When the deviation point where the vehicle deviated from the road is detected, the deviation point may be detected with the use of traveling path information acquired by recording a traveling path of the vehicle. For example, if it is determined that the current position of the vehicle is not on a road, a traveling path of the vehicle before the determination may be traced back to detect the deviation point where the vehicle deviated from the road. A specific example of detecting the deviation point is briefly described here.

FIG. 6-1 is a view of an example of a case when a vehicle deviates from a road to enter a parking lot. FIG. 6-2 is an explanatory view of a process when the deviation point is detected. As shown in FIG. 6-1, a vehicle 602 traveling on a road 601 deviates from the road 602 and enters a parking lot 603 from an entrance 604 of the parking lot in this case.

A traveling path 620 of the vehicle 602 shown in FIG. 6-2 represents a traveling path of the vehicle until the vehicle 602 deviates from the road 601 and enters the parking lot 603.

Points indicated on the traveling path 620 indicate the current positions of the vehicle 602 at respective times, e.g., predetermined time intervals.

For example, the deviation point of the vehicle 602 from the road 601 is detected from the current positions of the vehicle 602 indicated on the traveling path 620. Specifically, for example, based on the position information concerning the points indicated on the traveling path 620 and a road link 621 of the road 601 included in the road shape data, a point 623 identified as the last current position of the vehicle is calculated from road points 622 on the road 601, and the point 623 is defined as the deviation point of the vehicle 602 from the road 601.

The detected deviation point is recognized as an entrance point where the entrance 604 of the parking lot is located. Since this enables more accurate detection of the deviation point of the vehicle 602 from the road 601, more accurate recognition can be achieved for the entrance point where the entrance 604 of the parking lot is located.

The traveling path information representing the traveling path 620 of the vehicle 602 may automatically be recorded for a predetermined time period (e.g., five minutes) on the recording medium such as the magnetic disc 405 and the optical disc 407 or a memory not shown. The automatically recorded traveling path information is recorded in a cyclic manner and information older than a given elapsed period of time may be erased.

At step S505, the deviation point may be saved temporarily in the RAM 403, and operations on the vehicle by a driver may be detected by the various sensors 416, etc., to recognize the deviation point of the vehicle from the road as the entrance point to the parking lot, if it is determined that the vehicle is parked. For example, if it is determined that the current position of the vehicle is not on the road and the engine of the vehicle is then turned off (or the ACC power source is turned off), it is determined that the vehicle is parked and the above deviation point is recognized as the entrance point to the parking lot.

Alternatively, in such a case where the vehicle does not move from the same point for a predetermined period or where a driver applies the parking brake or changes a shift position to the parking position, the above deviation point is recognized as the entrance point to the parking lot. If it is determined that the vehicle is parked, this parking position may be determined as a parking lot position where the parking lot is located and may be recorded and correlated with the entrance point to the parking lot onto the recording medium such as the magnetic disc 405 and the optical disc 407 or a memory not shown.

If the current position of the vehicle is located within the parking lot, it may be determined that the vehicle is parked. Whether the current position of the vehicle is located within the parking lot is determined with the use of the sensitivity concerning signals received from GPS satellites by the GPS unit 415 or output values of the various sensors 416. For example, if signals cannot be received from the GPS satellites for a predetermined period or if the reception sensitivity of the signals is less than or equal to a predetermined threshold value, it is determined that the current position of the vehicle is located within the parking lot. Alternatively, if the various sensors 416 detect that the vehicle is traveling on a slope or that the vehicle repeatedly turns right and/or left at a low speed, it is determined that the current position of the vehicle is located within the parking lot.

Position information concerning the parking lot preliminarily recorded as the map information may be used to determine whether the current position of the vehicle is located within the parking lot. Signals may be received through the communication I/F 414 from an entrance/exit management system disposed at the entrance/exit of the parking lot to determine whether the current position of the vehicle is located within the parking lot, Returning to the description of the flowchart of FIG. 5, the recognized entrance point to the parking lot is recorded on the recording medium such as the magnetic disc 405 and the optical disc 407 (step S506), and a sequence of the process of the flowchart is ended. If it is determined at step S504 that the current position of the vehicle is on a road (step S504: YES), the procedure returns to step S501 to repeat a sequence of the processes according to the flowchart.

An entering method at the time of entry of the vehicle into the parking lot may also be recorded onto the recording medium, such as the magnetic disc 405 and the optical disc 407 or a memory not shown, along with the position information concerning the entrance point to the recognized parking lot. The entrance point to the parking lot and the entering method into the parking lot entrance are correlated and recorded. The entering method into the parking lot entrance is information indicating how the vehicle enters the parking lot entrance from a road and may be information indicating that the vehicle can turn right, turn left, or go straight to enter into the parking lot entrance from a road, for example.

The entering method into the parking lot entrance may be determined with the use of the position information indicating the current position of the vehicle identified at step S503, the output values from the various sensors 416, the map information, etc. Specifically, information concerning the current position of the vehicle, the traveling direction of the vehicle, and the road shape data of the road are utilized to determine, for example, that the vehicle turns right to enter into the parking lot entrance on the opposite side of the road. Steering operations, etc., performed by a driver may be detected to determine what degree of angle is formed when entering the parking lot entrance.

If it is determined that the vehicle is parked, the current position of the vehicle at this point may be recorded and correlated with the entrance point to the parking lot, onto the recording medium such as the magnetic disc 405 and the optical disc 407 or a memory not shown. If the type of the parking lot is determined with the use of the position information indicating the current position of the vehicle identified at step S503, the output values from the various sensors 416, the map information, etc., the type of the parking lot may be recorded and correlated with the parking lot position.

The type of the parking lot may be information indicating an outdoor parking lot, a multilevel parking lot, and an underground parking lot. When determining the type of the parking lot, for example, if the sensitivity does not change in the signals received from the UPS satellites by the GPS receiver, the parking lot is determined as an outdoor parking lot. For example, if the signals cannot be received from the UPS satellites located in a vertical direction or if it is detected that the mobile object ascends up a slope, the parking lot is determined as a multilevel parking lot. For example, if the reception sensitivity of the signals is less than or equal to a threshold value or if it is detected that the mobile object descends down a slope, the parking lot is determined as an underground parking lot. The number of turns made by the vehicle within the parking lot may be measured by the various sensors 416 to determine the number of levels of the parking lot.

As described above, various pieces of information recorded and correlated with the parking lot entrance may be displayed along with the parking lot information on the display and presented to a driver when the driver searches a parking lot, for example.

A route to the parking lot entrance can be retrieved by setting a destination as the parking lot position recorded and correlated with the entrance point to the parking lot. If the entering method into the parking lot entrance is also recorded, a route taking into account the entering method can be retrieved. For example, to facilitate entrance into the parking lot, a search can be performed for a route that enables the vehicle to turn left to enter the parking lot entrance.

The position information concerning the recorded parking lot position may be edited automatically to create a parking lot list. The created parking lot list is displayed on the display 413 when a user searches for a parking lot. The user may select a parking lot from the parking lot list displayed on the display 413 to perform the parking lot search.

Figure 7:
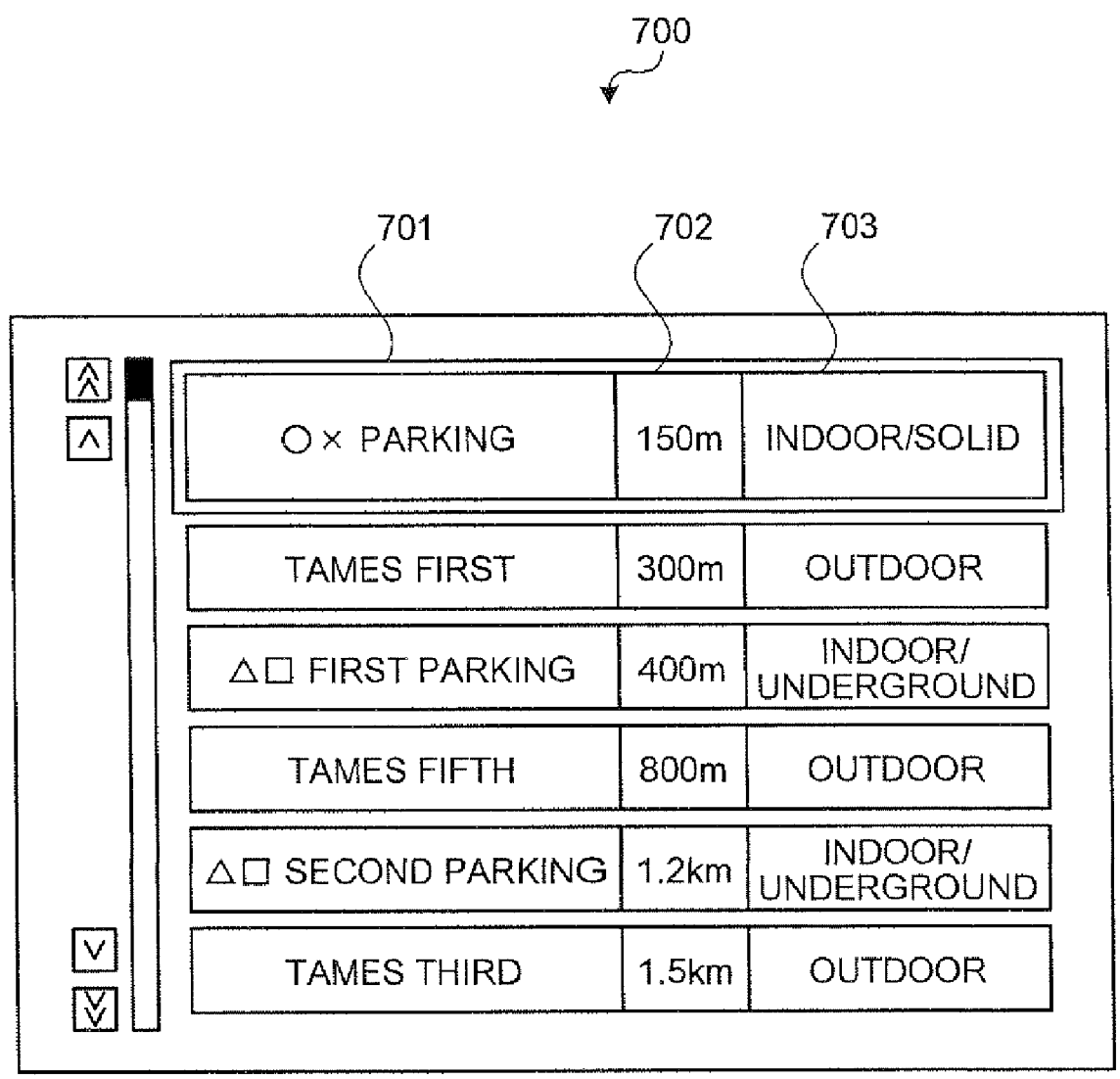
FIG. 7 is a view of an example of a parking lot list displayed on a display.

FIG. 7 is a view of an example of the parking lot list displayed on the display. As shown in FIG. 7, on a parking lot list 700, for example, parking lot names 701 are displayed from the top in ascending order of distances from the current position of the vehicle to the respective parking lot positions. The parking lot names 701 are displayed in conjunction with distances 702 from the current position to the parking lot positions and parking lot types 703. The parking lot types 703 are pieces of information indicating an indoor parking lot and an outdoor parking lot (multilevel parking lot/underground parking lot) as described above.

A user can select a parking lot for the route retrieval from the parking lot list 700 with reference to details displayed on the display 413. For example, if a user is in a hurry, the closest parking lot can be selected since time is limited, or a parking lot other than a multilevel parking lot can be selected when the height of the vehicle is high. Therefore, a user can easily find a desired parking lot and can simply search for a parking lot by referencing the automatically created parking lot list 700.

The pieces of the position information concerning the recorded parking lot position may be classified and recorded by area (e.g., in vicinities of stations, in vicinities of facilities, cities, towns, and villages) to create parking lot lists for the respective areas. When a user specifies an area to search for a parking lot, a parking lot list created for the respective area is displayed on the display 413.

Figure 8:
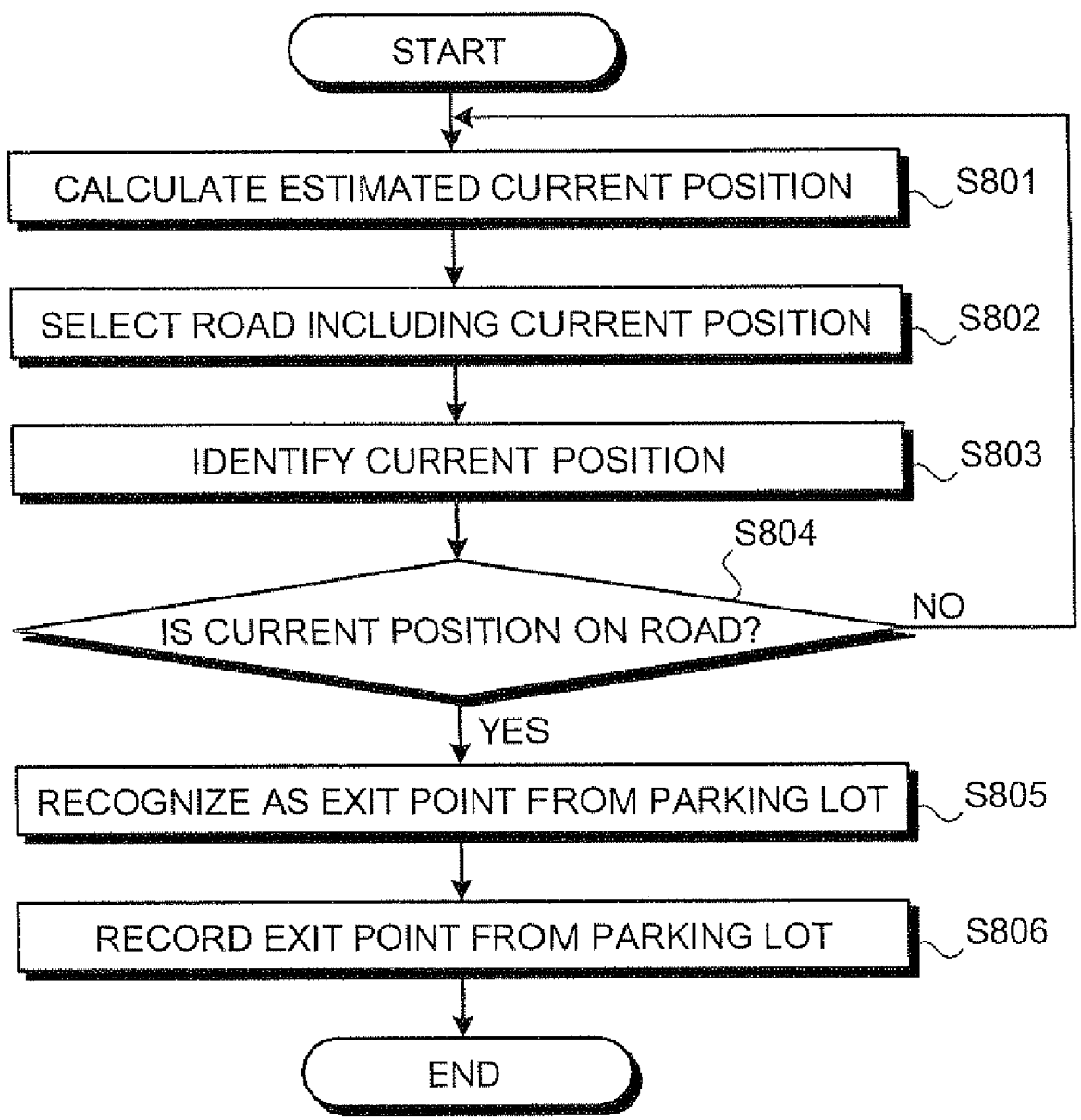
FIG. 8 is a flowchart of another example of the position recording process procedure of the navigation apparatus according to the example of the present invention.

Another example of the position recording process procedure of the navigation apparatus 400 according to the example of the present invention is described. FIG. 8 is a flowchart of another example of the position recording process procedure of the navigation apparatus according to the example of the present invention. Details of the process described in the flowchart of FIG. 8 are descriptions of a process when the vehicle returns onto a road again after the entrance point to the parking lot is recorded on the recording medium such as the magnetic disc 405 and the optical disc 407 or the memory not shown at step S506 of the flowchart of FIG. 5.

As shown in the flowchart of FIG. 8, details of the process executed by the navigation apparatus 400 at steps S801 to S804 are the same as the details of the process from step S501 to step S504 described in the flowchart of FIG. 5 and, therefore, description thereof is omitted and description herein begins from the process of step S508.

If it is determined at step S804 that the current position of the vehicle is on a road (step S804: YES), a returning point of the vehicle onto the road from outside the road is recognized as an exit point from the parking lot (step S805). The returning point is the first current position of the vehicle identified on a road.

When the returning point of the vehicle onto the road from outside the road is detected, the returning point may be detected with the use of traveling path information acquired by recording a traveling path of the vehicle. For example, if it is determined that the current position of the vehicle is on a road, a traveling path of the vehicle before the determination may be traced back to detect the returning point of the vehicle to the road from outside the road. A specific example of detecting the returning point is briefly described here.

Figures 1, 9:
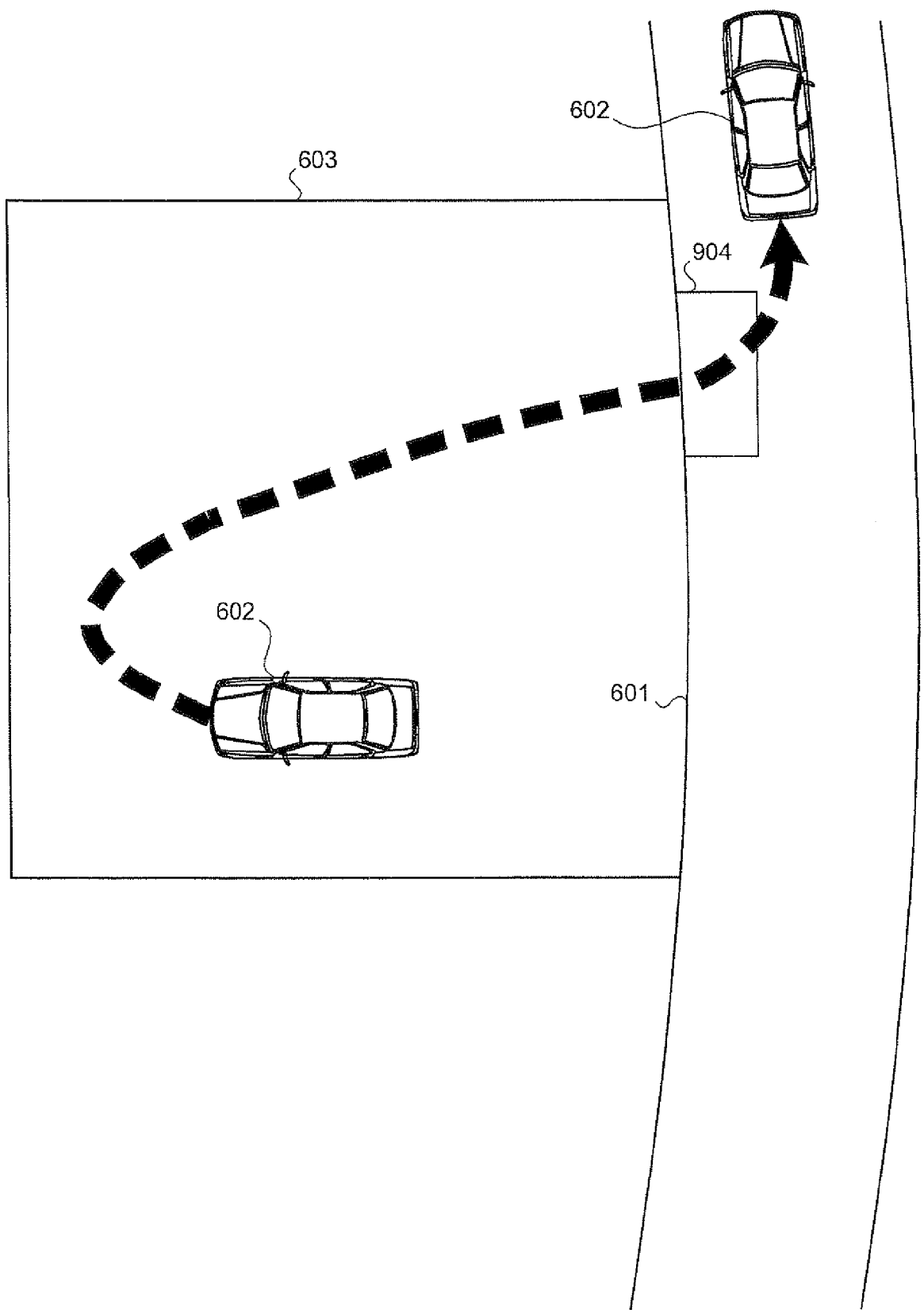
Figures 2, 9:
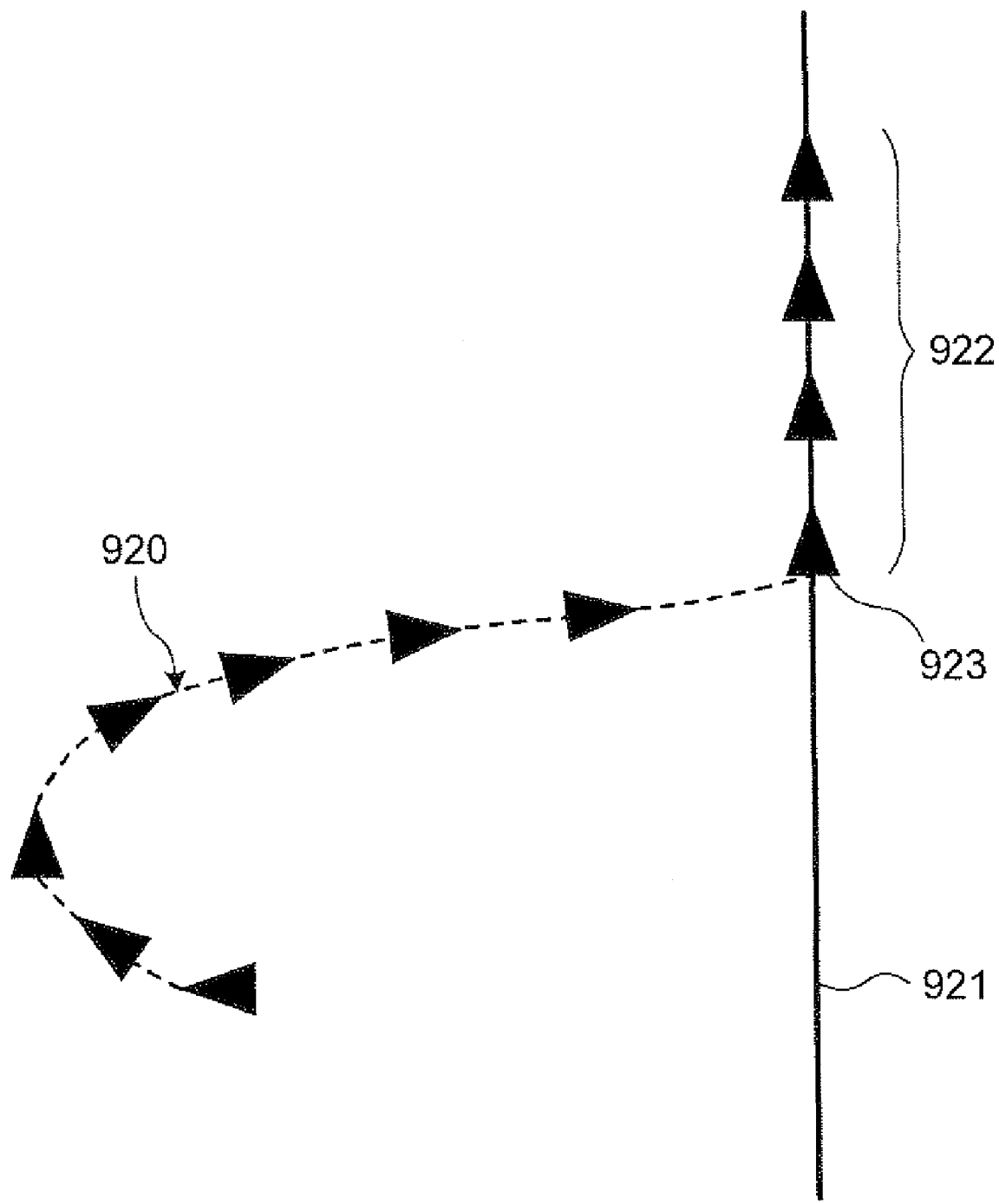

FIG. 9-1 is a view of an example of a case when a vehicle exits from a parking lot onto a road. FIG. 9-2 is an explanatory view for explaining a process when the returning point is detected. As shown in FIG. 9-1, the vehicle 602 exits from an exit of the parking lot and returns onto the road 601 to start traveling again in this case.

A traveling path 920 of the vehicle 602 shown in FIG. 9-2 represents a traveling path of the vehicle until the vehicle 602 exits the parking lot 603 and returns onto the road 601. Points indicated on the traveling path 920 indicate the current positions of the vehicle 602 at respective times, e.g., predetermined time intervals.

For example, the returning point of the vehicle 602 onto the road 601 is detected from the current positions of the vehicle 602 indicated on the traveling path 920. Specifically, for example, based on the position information concerning the points indicated on the traveling path 920 and a road link 921 of the road 601 included in the road shape data, a point 923 identified as the first current position of the mobile object is calculated from road points 922 on the road 601, and this point 923 is defined as the returning point of the vehicle 602 onto the road 601.

The detected returning point is recognized as an exit point where the exit 904 of the parking lot is located. Since this enables more accurate detection of the returning point of the vehicle 602 exiting from the parking lot to return onto the road 601, more accurate recognition can be achieved for the exit position where the exit 904 of the parking lot is located.

The traveling path information representing the traveling path 920 of the vehicle 602 may be recorded automatically for a predetermined time period (e.g., five minutes) on the recording medium such as the magnetic disc 405 and the optical disc 407 or a memory not shown. The automatically recorded traveling path information is recorded in a cyclic manner and information older than a given elapsed period of time may be erased.

Returning to the description of the flowchart of FIG. 8, the recognized exit point from the parking lot is recorded on the recording medium such as the magnetic disc 405 and the optical disc 407 (step S806), and a sequence of the process of the flowchart is ended. If it is determined at step S804 that the current position of the vehicle is not on a road (step S804: NO), the procedure returns to step S801 to repeat a sequence of the processes of the flowchart.

When the exit point from the parking lot is recorded, the exit position may be recorded and correlated with the entrance point to the parking lot recorded at step S506.

An exiting method at the time of exiting of the vehicle from the parking lot may also be recorded onto the recording medium, such as the magnetic disc 405 and the optical disc 407 or a memory not shown, along with the position information concerning the exit point from the recognized parking lot. The exit point from the parking Lot and the exiting method from the parking lot exit are correlated and recorded. The exiting method from the parking lot exit is information indicating how the vehicle exits the parking lot exit onto a road and may be information indicating that the vehicle can turn right, turn left, or go straight to exit the parking lot exit onto a road, for example.

The exiting method from the parking lot exit may be determined with the use of the position information indicating the current position of the vehicle identified at step S803, the output values from the various sensors 416, the map information, etc. Specifically, position information indicating the current position of the vehicle, the traveling direction of the vehicle, and the road shape data of the road are utilized to determine whether the vehicle turns right to return on the road or turns left to return on the road, for example.

When a route from the inside of the parking lot to an arbitrary destination is retrieved, a route taking into account the exit point from the parking lot can be retrieved. If the exiting method is recorded and correlated with the parking lot exit, a route taking into account the exiting method can be retrieved. For example, if the recorded exiting method indicates that the vehicle can turn left from the parking lot exit to return on the road, a route of turning left to exit the parking lot is retrieved.

If the entrance point to the parking lot recognized at step S505 of the flowchart of FIG. 5 is determined as substantially the same position as the exit point from the parking lot recognized at step S805 of the flowchart of FIG. 8, the entrance point and the exit point of the parking lot may be recognized as an entrance/exit point of the parking lot. This enables more accurate detection of the entrance/exit of the parking lot.

As described above, according to this example, if the current position of the vehicle identified on a road is identified to be at a place other than a road, the navigation apparatus 400 can automatically record the deviation point of the vehicle from the road as an entrance point to a parking lot. If the current position of the vehicle identified at a place other than a road is identified to be on a road, the navigation apparatus 400 can automatically record the returning point of the vehicle returned onto the road as an exit point from a parking lot.

The navigation apparatus 400 can automatically record a place of a vehicle parked outside the road as a parking lot position. Since this position can be recorded and correlated with the entrance point to the parking lot, when a route to the parking lot is retrieved, a route to the entrance point to the parking lot can be retrieved. This enables a user to check the entrance point to the parking lot when the user arrives at the parking lot along the retrieved route and the user can easily enter into the parking lot.

When a route to an arbitrary destination is searched for from the inside of the parking lot having the parking lot exit position recorded, the navigation apparatus 400 can retrieve a route taking into account the exit point from the parking lot. Therefore, a user can known a traveling direction of a vehicle in advance when exiting from the parking lot.

The navigation apparatus 400 can record and correlate the entering method to the parking lot entrance, the exiting method from the parking lot exit, and a type of the parking lot with the entrance point and the exit point from the parking lot. Therefore, for example, when a route to the parking lot is retrieved, a route taking into account the entering method into the parking lot entrance can be retrieved. When a route from the parking lot to an arbitrary destination is retrieved, the navigation apparatus 400 can retrieve a route taking into account the exiting method from the parking lot exit.

The navigation apparatus 400 can create a parking lot list with the use of various pieces of the information recorded and correlated with the entrance points and the exit positions of parking lots. Since a user can search for a parking lot with the reference to the created parking lot list, the user can easily find a desired parking lot and can simply perform a search for a parking lot.

As described above, the navigation apparatus 400 can automatically record various pieces of information such as the parking lot entrance point and exit point not preliminarily recorded as map information and can utilize the information when a user conducts route search, etc. Therefore, a user can acquire the optimum route suitable for the environment of use, and convenience for the user can be improved.

The position registering method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:

1. A position registering apparatus comprising:
an acquiring unit that acquires traveling state information indicating a traveling state of a mobile object;
a position identifying unit that identifies a current position of the mobile object based on the traveling state information and map information;
a registering unit that registers, into a storage unit, a point of deviation from a road by the mobile object as an entrance point to a parking lot when the current position that has been identified to be on the road is identified to be at a place other than on the road; and
a parking determining unit that determines whether the mobile object is parked when the current position is identified to be at a place other than on a road, wherein
the registering unit registers the point of deviation as the entrance point when the mobile object is determined to be parked, and registers the current position identified upon the parking determining unit determining that the mobile object is parked, as a parking lot position correlated with the entrance point.

2. The position registering apparatus according to claim 1, further comprising a type determining unit that, when the parking determining unit determines that the mobile object is parked, determines a type of the parking lot based on the traveling state of the mobile object after the current position that has been identified to be on the road is identified to be at a place other than on the road, wherein
the registering unit registers and correlates the type of the parking lot with the parking lot position.

3. A navigation apparatus comprising:
a position registering apparatus including
an acquiring unit that acquires traveling state information indicating a traveling state of a mobile object,
a position identifying unit that identifies a current position of the mobile object based on the traveling state information and map information,
a registering unit that registers, into a storage unit, a point of deviation from a road by the mobile object as an entrance point to a parking lot when the current position that has been identified to be on the road is identified to be at a place other than on the road, and
a parking determining unit that determines whether the mobile object is parked when the current position is identified to be at a place other than on a road, wherein
the registering unit registers the point of deviation as the entrance point when the mobile object is determined to be parked, and registers the current position identified upon the parking determining unit determining that the mobile object is parked, as a parking lot position correlated with the entrance point;
a generating unit that generates a parking lot list including parking lot information corresponding to the parking lot position registered by the registering unit; and
a display unit that displays the parking lot list when a parking lot is searched for.

4. A navigation apparatus comprising:
a position registering apparatus including
an acquiring unit that acquires traveling state information indicating a traveling state of a mobile object, a position identifying unit that identifies a current position of the mobile object based on the traveling state information and map information, a registering unit that registers, into a storage unit, a point of deviation from a road by the mobile object as an entrance point to a parking lot when the current position that has been identified to be on the road is identified to be at a place other than on the road, and a parking determining unit that determines whether the mobile object is parked when the current position is identified to be at a place other than on a road, and a type determining unit that, when the parking determining unit determines that the mobile object is parked, determines a type of the parking lot based on the traveling state of the mobile object after the current position that has been identified to be on the road is identified to be at a place other than on the road, wherein the registering unit registers the point of deviation as the entrance point when the mobile object is determined to be parked, registers the current position identified upon the parking determining unit determining that the mobile object is parked, as a parking lot position correlated with the entrance point, and correlates the type of the parking lot with the parking lot position;

a generating unit that generates a parking lot list including parking lot information and type information corresponding to the parking lot position registered by the registering unit; and a display unit that displays the parking lot list when a parking lot is searched for.

5. A route retrieval apparatus comprising:

a position registering apparatus including an acquiring unit that acquires traveling state information indicating a traveling state of a mobile object, a position identifying unit that identifies a current position of the mobile object based on the traveling state information and map information, a registering unit that registers, into a storage unit, a point of deviation from a road by the mobile object as an entrance point to a parking lot when the current position that has been identified to be on the road is identified to be at a place other than on the road, and a parking determining unit that determines whether the mobile object is parked when the current position is identified to be at a place other than on a road, wherein the registering unit registers the point of deviation as the entrance point when the mobile object is determined to be parked, and registers the current position identified upon the parking determining unit determining that the mobile object is parked, as a parking lot position correlated with the entrance point;

a destination setting unit that sets the parking lot position registered in the storage unit as a destination; and a route retrieving unit that retrieves a route to the entrance point registered and correlated with the parking lot position when the parking lot position is set as the destination.

6. A route retrieval apparatus comprising:

a position registering apparatus including an acquiring unit that acquires traveling state information indicating a traveling state of a mobile object, a position identifying unit that identifies a current position of the mobile object based on the traveling state information and map information, a registering unit that registers, into a storage unit, a point of deviation from a road by the mobile object as an entrance point to a parking lot when the current position that has been identified to be on the road is identified to be at a place other than on the road, and a parking determining unit that determines whether the mobile object is parked when the current position is identified to be at a place other than on a road, wherein the registering unit registers the point of deviation as the entrance point when the mobile object is determined to be parked, and registers the current position identified upon the parking determining unit determining that the mobile object is parked, as a parking lot position correlated with the entrance point;

a destination setting unit that sets a destination;

a route retrieving unit that retrieves a route to a destination from an exit position registered and correlated with the parking lot position when the destination is set while the current position of the mobile object is within a predetermined range from the parking lot position and identified at a place other than on a road.

7. A position registering method comprising:

acquiring traveling state information indicating a traveling state of a mobile object;

identifying a current position of the mobile object based on the traveling state information and map information;

registering, into a storage unit, a point of deviation from a road by the mobile object as an entrance point to a parking lot when the current position that has been identified to be on the road is identified to be at a place other than on the road; and determining whether the mobile object is parked when the current position is identified to be at a place other than on a road, wherein the registering includes registering the point of deviation as the entrance point when the mobile object is determined to be parked, and registering the current position identified upon determining that the mobile object is parked, as a parking lot position correlated with the entrance point.

8. A computer-readable recording medium storing therein a position registering computer-program that causes a computer to execute:

acquiring traveling state information indicating a traveling state of a mobile object;

identifying a current position of the mobile object based on the traveling state information and map information;

registering, into a storage unit, a point of deviation from a road by the mobile object as an entrance point to a parking lot when the current position that has been identified to be on the road is identified to be at a place other than on the road; and determining whether the mobile object is parked when the current position is identified to be at a place other than on a road, wherein the registering includes registering the point of deviation as the entrance point when the mobile object is determined to be parked, and registering the current position identified upon determining that the mobile object is parked, as a parking lot position correlated with the entrance point.

* * * * *